TRANSISTOR TRIGGER CIRCUIT

Filed May 23, 1955

INVENTOR
E. E. SUMNER
BY
William F. Simpson
ATTORNEY

United States Patent Office 2,831,128

Patented Apr. 15, 1958

2,831,128

TRANSISTOR TRIGGER CIRCUIT

Eric E. Sumner, North Caldwell, N. J., assignor to Bell Telephone Laboratories, Incorporated, New York, N. Y., a corporation of New York Application May 23, 1955, Serial No. 510,455

4 Claims. (Cl. 307—88.5)

Figure 1:
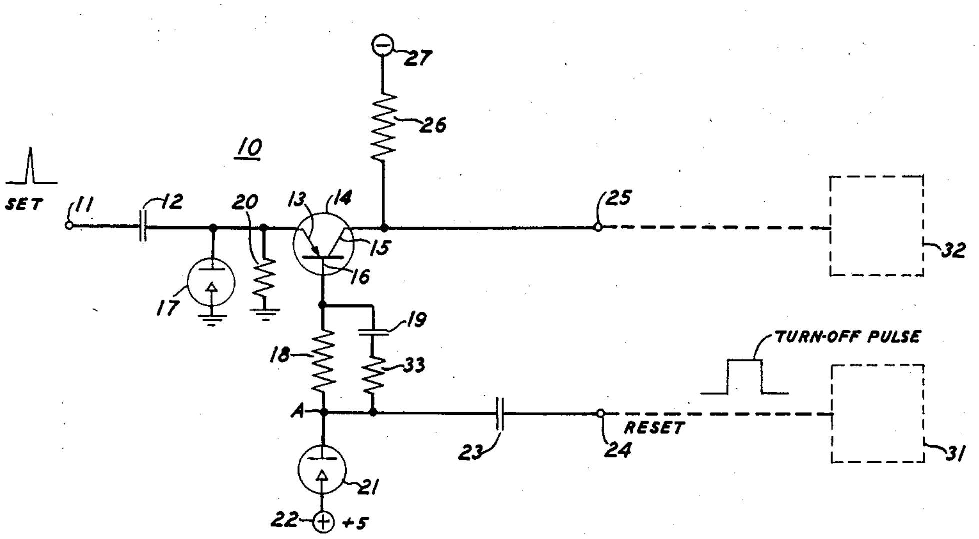

This invention relates to trigger circuits and more particularly to transistor bistable trigger circuits.

A trigger circuit is one which generally has at least one equilibrium position and can be rapidly shifted, displaced or triggered from that condition. Devices such as transistors which have a current amplification factor greater than one lend themselves to trigger circuit applications. By connecting a relatively large impedance to the base electrode of the transistor, an input transistor characteristic having a negative resistance region is obtained. By triggering the circuit is meant causing the transistor to rapidly pass from an equilibrium condition through the negative resistance region. Such trigger circuits having a transistor and a base impedance are disclosed, for example, in Patent 2,629,833 issued to R. L. Trent on February 24, 1953. Trigger circuits may be monostable having one equilibrium condition, astable having no equilibrium condition or bistable having two equilibrium conditions.

In high speed switching systems and computer applications it is often necessary to provide a regenerative transistor circuit which supplies output pulses that are substantially independent of the transistor, the circuit parameters and the shape of the input pulse. These features may be accomplished by utilizing a single transistor bistable circuit which is triggered to its high-current state by signal pulses fed to the transistor emitter and which is reset to its low-current state by a regular succession of pulses fed to the transistor base. The reset pulses applied to the transistor base control the duration of the pulses generated by the trigger circuit. When the output load of the trigger circuit is large, however, the utilization of reset pulses may be ineffective to control the duration of the output pulses. It the reset pulses are supplied to the transistor base through the base resistor, the resistor limits the reset current so that undesirably large reset pulses are required, and if the reset pulses are supplied directly to the transistor base, the trailing edge of the reset pulse often retriggers the circuit. If the pulse due to the trailing edge is removed by series rectifying circuit means, such means which include a biasing resistor present a relatively low impedance to the reset pulse so that much larger reset pulses are required. Applying the reset pulses to the transistor emitter may also be ineffective as often the emitter circuit components which provide for the bistability inhibit reducing the emitter-to-base potential sufficiently to reset the transistor.

It is an object of the present invention to assure turning off the bistable circuit regardless of its output load and to present a maximum impedance to the turnoff pulse source during the turnoff interval.

In an embodiment of the present invention, the transistor amplifier includes a base resistor connected to a potential source through a varistor. The junction between the varistor and the resistor is connected to the reset pulse supply circuit which is also connected through a turnoff pulse capacitor to the base of the transistor. The turnoff capacitor allows a relatively large amount of base current during the brief interval at the beginning of the reset pulse to insure resetting the transistor even though the output load of the transistor is large.

Figure 2:
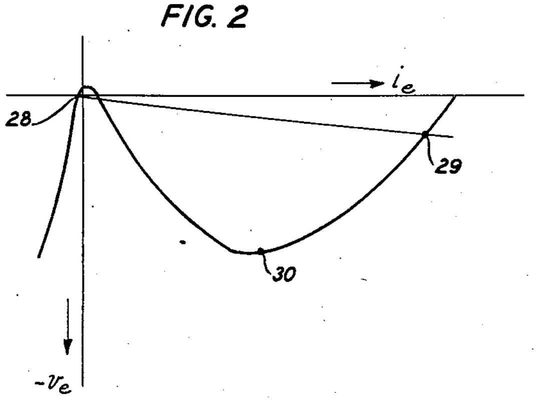

Further objects of the present invention may be more fully understood from the following description when read in conjunction with the attached drawings wherein:

Fig. 1 is a circuit representation of a bistable circuit embodying features of the present invention; and Fig. 2 is the input characteristic of a typical transistor utilized in the bistable circuit of the present invention.

Referring to Fig. 1, the input terminal 11 of the transistor trigger circuit 10 is coupled through the capacitor 12 to the emitter electrode 13 of transistor 14. The transistor 14 is a point contact transistor of the type disclosed in the Patent 2,524,035 granted to J. Bardeen and W. H. Brattain on October 3, 1950. The present invention is not restricted to the utilization of this type of transistor as, for example, junction transistors, of the type disclosed for example in Patent 2,623,102 granted to W. Shockley on December 23, 1952, or in Patent 2,663,806 granted to S. Darlington December 22, 1953 may be employed instead of a point contact transistor.

Electrode current is deemed positive if it flows from the electrode into the semiconductive body. A small positive current applied to the emitter electrode 13 results in a negative current through the collector electrode 15 which exceeds the emitter current in magnitude. If the semiconductive body is of P-type material the directions of electrode current, the polarity of the pulses, and the poling of the biasing batteries hereinafter described are reversed. The transistor 14 is assumed to be N type in the following description although the invention itself contemplates P-type transistors as well as other known types.

The base electrode 16 of transistor 14 is connected to the positive potential source 22 through the feedback promoting resistor 18 and the diode or varistor 21. The varistor 21 is poled in the direction of positive base current. The resistor 18 functions together with the transistor 14 to provide for a negative resistance characteristic shown in Fig. 2. The base current is the algebraic sum of the emitter and collector current, and since the collector current is normally negative and larger in magnitude than the emitter current, the normal base current, for positive emitter current, is positive. Therefore when the transistor 14 is triggered, as is hereinafter described, a positive emitter current will result in a positive base current which, by flowing through the large base resistor 18, makes the base electrode 16 negative with respect to the emitter electrode 13. When the base electrode 16 becomes negative with respect to the emitter electrode 13, the emitter current is further increased inducing an even larger positive base current. It is this regenerative feedback action which gives rise to the negative resistance characteristic shown in Fig. 2.

The varistor 21 functions to provide a high base impedance when the transistor base is driven positive and to present a low impedance when the transistor 14 is triggered to its high-current condition. The junction between resistor 18 and varistor 21, which is designated as junction A, is connected through the coupling capacitor 23 to the reset terminal 24. The reset terminal 24 is in turn connected to a turnoff or reset pulse supply circuit 31 which supplies substantially square-shaped turnoff pulses to the trigger circuit 10. The junction A is also connected through a resistor 33 and turnoff pulses capacitor 19 to the base 16 of transistor 14.

The emitter electrode 13 is connected to ground through the diode or varistor 17 which is poled in the direction of positive emitter current and also through the resistor 20. The varistor 17 and resistor 20 provide for an emitter load line which intersects the emitter voltage versus emitter-current characteristic at points 28 and 29 in Fig. 2. The resistor 20 functions during the low-current quiescent condition, represented by point 28 to prevent the base-to-emitter leakage current from increasing the emitter potential due to circuit noise etc., and falsely triggering the circuit 10. If resistor 20 were omitted the high reverse impedance of varistor 17 would provide for a relatively large increase in emitter potential for a small leakage current increase. It will be seen that transistor 14 can reach its high-current equilibrium condition at point 29 in Fig. 2 only when the turnoff pulse is not present and will always be driven back to the low-current condition at point 28 by the next turnoff pulse which is applied to the base 16. Therefore the onset and the duration of each output pulse are under the control of the turnoff pulses and are substantially independent of the transistor, the shape of the input pulses and the circuit parameters.

When a positive pulse is provided through the input terminal 11 to the emitter electrode 13, the varistor 17 becomes reversed-biased and the potential at the emitter electrode 13 increases. Increasing the emitter-to-base potential causes the circuit 10 to trigger through the negative resistance region of its input characteristic to the high-current equilibrium condition at point 29. When the circuit 10 enters the negative resistance region, both varistors 17 and 21 become forward-biased to allow for the rapid increase in current. With the circuit 10 at point 29, an output pulse is provided through terminal 25 to the output circuit or load 32 from the collector 15 which is also connected through resistor 26 to battery 27.

The circuit 10, which has been described without the turnoff supply circuit 31, is actually a bistable circuit rather than an amplifier. In order to provide a regenerative amplifier it is customary to replace the varistor 17 with a capacitor. If that is done the circuit becomes nonostable instead of bistable. There are at least two disadvantages to using a capacitor to provide automatic cutoff in high speed applications. One is that the duration of the output pulse depends upon the slope of the transistor characteristic as well as load and the other is that in triggering the circuit the capacitor must be charged to the peak characteristic potential. This means that if significant delays are to be avoided in high speed applications, a larger triggering current is required than when the varistor 17 is used. In typical cases, the circuit shown in Fig. 1 can be triggered by one-quarter of a milliampere without delay significant to a computer operating at a megacycle rate.

Applying a turnoff pulse directly to the emitter 13 or to the base 16 is unsatisfactory. Turning off the transistor bistable circuit 10 by a voltage applied at the emitter 13 is extremely difficult because the emitter has to be pulled negative with respect to point 30 in Fig. 2 and the voltage drop has to be developed across the low impedance of conducting varistor 17. If a positive turnoff pulse were applied directly to the base 16 it would function to reset the circuit 10 to point 28 in Fig. 2. The input characteristic, however, would be modified by the turnoff circuit connection across the feedback promoting resistor 18. The relatively large capacitor 23 which connects the turnoff circuit 31 directly to the base 16 would effectively provide a short-circuiting path for resistor 18 to inhibit triggering circuit 10. What is even more harmful is the fact that the trailing edge of the turnoff pulse tends to retrigger circuit 10. Utilizing a varistor instead of the capacitor 23 functions in a similar manner to short-circuit resistor 18 and retrigger circuit 10. If the varistor is biased to remove the effect of the trailing edge, the biasing circuit increases the load seen by the turnoff pulse so that a much larger pulse is required to turn off circuit 10. Turning off circuit 10 without increasing the turnoff pulse is achieved by applicant's novel arrangement.

The circuit 10 can be shut off or reset by a positive turnoff pulse applied at the base 16 through the capacitor 23 and resistor 18. When the capacitive circuit including resistor 33 and capacitor 19 is not utilized and the resistor 26 is small or the load circuit 32 presents a small impedance, the turnoff pulse cannot build up to the necessary amplitude from point 29 to point 30 in Fig. 2. In order for the circuit 10 to be reset, the base current must satisfy the following formula:

$$I_b > \frac{\alpha-1}{\alpha}\frac{V27}{R26}$$

where $I_b$ is the base current, $\alpha$ is the amplification factor of transistor 14, V27 represents the voltage of battery 27 and R26 is the load resistance. When the formula is satisfied the transistor circuit 10 presents a high impedance for the circuit 31 and the turnoff potential can sufficiently increase. The positive turnoff pulse supplied from circuit 31 reverse-biases the varistor 21. The potential at junction A rises to a potential roughly corresponding to the height of the turnoff pulse and remains there for the duration of the pulse. At the end of the turnoff pulse junction A becomes negative with respect to the potential of battery 22 and forward-biases the varistor 21. When varistor 21 becomes forward-biased it clamps junction A to the potential of battery 22.

The maximum base current without the capacitive circuit including capacitor 19 is somewhat less than the magnitude of the turnoff pulse divided by the resistance of resistor 18. If the collector resistor 26 is low or the output circuit or load 32 large, the base current may not reach a sufficient magnitude to comply with the above equation and turn off the circuit 10. By utilizing a small capacitor 19, the resistor 18 is effectively by-passed during the initial turnoff interval so that a large base current is provided without increasing the height of the turnoff pulse. The turnoff current is controlled or limited by the small resistor 33 which is connected in series with the capacitor 19. The utilization of the capacitor 19 in this manner allows for proper turnoff when the transistor circuit 10 is heavily loaded. The capacitor 19 is only needed during the initial build-up of turnoff current. Once circuit 10 triggers to its low-current equilibrium condition, the base circuit presents a high impedance to circuit 31.

When the circuit 10 is in its low-current quiescent condition, a turnoff pulse inhibits the triggering action of a pulse through terminal 11. The input pulse through terminal 11 is insufficient to increase the emitter-to-base potential sufficiently to trigger circuit 10 when a turnoff pulse is present. The path from base 16 through capacitor 19, resistor 33 and capacitor 23 to circuit 31 does not effectively short-circuit the feedback resistor 18 when a trigger pulse is applied to terminal 11. In the absence of a reset pulse the capacitor 19 which is relatively small presents sufficient impedance not to inhibit the triggering action upon the application of a pulse to terminal 11.

In an exemplary embodiment of the present invention the turnoff pulse has an amplitude of 15 volts and a duration of 500 microseconds, and the circuit parameters are as follows:

| | | |
|---|---|---|
| Capacitor 12 | microfarads | .01 |
| Resistor 18 | ohms | 3,000 |
| Capacitor 19 | microfarads | .005 |
| Resistor 20 | ohms | 50,000 |
| Battery 22 | volts | +5 |
| Capacitor 23 | microfarads | .05 |
| Resistor 26 | ohms | 500 |
| Battery 27 | volts | −20 |
| Resistor 33 | ohms | 200 |

It is to be understood that the above-described arrangements are illustrative of the application of the principles of this invention. Numerous other arrangements may be devised by those skilled in the art without departing from the spirit and scope of the invention.

What is claimed is:

1. A transistor trigger circuit comprising a transistor having an emitter electrode, a base electrode, and a collector electrode; a base resistor connected to said base electrode; a first varistor poled in the direction of positive base current connected to said base resistor; a second varistor poled in the direction of positive emitter current connected to said emitter electrode; a turnoff pulse supply circuit connected to said base resistor and to said first varistor; and a turnoff by-pass capacitor shunting said base resistor.

2. A regenerative pulse amplifier which comprises in combination a transistor having emitter, collector and base electrodes, a base resistor common to the emitter-base and the collector-base paths of said transistor, a first asymmetrically conducting device connected to said emitter electrode and poled in the direction of positive emitter current, a second asymmetrically conducting device poled in the direction of positive base current connected to said base resistor, a large output load connected to said collector electrode, a source of direct voltage poled to bias said second conducting device in the forward direction, an input terminal connected to said emitter electrode for receiving signal pulses to trigger said transistor to its high-current state, circuit means connected to said base resistor for supplying a succession of turnoff pulses to reset said transistor to its low-current state and to inhibit triggering during this turnoff pulse, and circuit means connecting said base electrode with said off supply circuit means for effectively bypassing said base resistor during the initial interval of each turnoff pulse.

3. A regenerative pulse amplifier which comprises in combination a transistor having emitter, collector and base electrodes, a base resistor common to the emitter-base and the collector-base paths of said transistor, a first asymmetrically conducting device connected to said emitter electrode and poled in the direction to provide a low resistance conduction path for emitter current when said emitter is conducting current in the forward direction, a second asymmetrically conducting device connected to said base resistor and poled in the direction to provide a low resistance conduction path for actual base current, an output load connected to said collector electrode, a source of direct voltage poled to bias said second conducting device in the forward direction, an input terminal connected to said emitter electrode for receiving signal pulses to trigger said transistor to its high-current state, circuit means connected to said base resistor for supplying a succession of turnoff pulses, and capacitive circuit means connecting said base electrode with said supply circuit means for resetting said transistor to its low-current state independently of variations of said output load.

4. A transistor trigger circuit comprising a transistor having an emitter electrode, a base electrode, and a collector electrode, a base resistor connected to said base electrode, a diode connected to said base resistor and poled to pass in its forward direction the current of the base electrode, a turnoff pulse supply circuit connected to said base resistor and to said diode, and a turnoff by-pass capacitor shunting said base resistor for effectively by-passing said base resistor during the initial interval of each turnoff pulse.

References Cited in the file of this patent

UNITED STATES PATENTS

| | | |
|---|---|---|
| 2,670,445 | Felker | Feb. 23, 1954 |
| 2,679,594 | Fromm | May 25, 1954 |
| 2,759,052 | Macdonald et al. | Aug. 14, 1956 |